(12) United States Patent
Sen et al.

(10) Patent No.: US 8,838,174 B2
(45) Date of Patent: Sep. 16, 2014

(54) DEVICE INITIATED CARD PROVISIONING VIA BEARER INDEPENDENT PROTOCOL

(75) Inventors: Abhishek Sen, San Jose, CA (US); Madhusudan Chaudhary, Sunnyvale, CA (US); Karthik Anantharaman, Cupertino, CA (US); Abdul-Munem Al-Khudairi, Santa Clara, CA (US); Prashant H. Vashi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 13/598,554

(22) Filed: Aug. 29, 2012

(65) Prior Publication Data
US 2013/0295997 A1 Nov. 7, 2013

Related U.S. Application Data
(60) Provisional application No. 61/643,197, filed on May 4, 2012.

(51) Int. Cl.
*H04B 1/38* (2006.01)
(52) U.S. Cl.
USPC .......................................... 455/558; 455/418
(58) Field of Classification Search
USPC .................................................. 455/418, 558
See application file for complete search history.

(56) References Cited

U.S. PATENT DOCUMENTS

| | | | |
|---|---|---|---|
| 2009/0254669 A1 | 10/2009 | Deprun et al. | |
| 2012/0172089 A1 | 7/2012 | Bae et al. | |
| 2012/0190354 A1 | 7/2012 | Merrien et al. | |
| 2014/0011491 A1* | 1/2014 | ZIMMERMAN et al. | ... 455/419 |

FOREIGN PATENT DOCUMENTS

WO WO2011/075853 6/2011

OTHER PUBLICATIONS

Dunn, cdma2000 Card Environments and Provisioning, Jun. 14, 2012, 3rd Generation Partnership Project 2, cdma2000 Technology Workshop, 15 pages.

* cited by examiner

*Primary Examiner* — Lee Nguyen
(74) *Attorney, Agent, or Firm* — Womble Carlyle Sandridge & Rice LLP

(57) ABSTRACT

A processor in a mobile wireless device provisions a user identity module (UIM) card in the mobile wireless device in response to a user command. The processor detects a user command to provision the UIM card and reads a provisioning status of the UIM card from a UIM card provisioning status file in the UIM card. When the provisioning status is "not provisioned", the processor establishes a bearer independent protocol (BIP) data connection to a server in a wireless network and exchanges provisioning data between the server and the UIM card until the UIM card commands the processor to close the BIP data connection. In representative embodiments, the UIM card provisioning status file includes fields for a UIM card provisioning status, a UIM card software version and a UIM card provisioning date/time, and the processor updates the fields during provisioning.

20 Claims, 9 Drawing Sheets

800

| EF Card Prov Status | | |
|---|---|---|
| Byte(s) | Description | Length |
| 1 | Provisioning Status | 1 |
| 2 | Card Software Version | 4 |
| 6 | Provisioning Date/Time | 7 |

Figure 8

DEVICE INITIATED CARD PROVISIONING VIA BEARER INDEPENDENT PROTOCOL

CROSS-REFERENCE TO RELATED APPLICATION

This application claims priority to U.S. Provisional Patent Application No. 61/643,197, filed May 4, 2012, and entitled "DEVICE INITIATED CARD PROVISIONING VIA BEARER INDEPENDENT PROTOCOL", which is incorporated herein by reference in its entirety and for all purposes.

TECHNICAL FIELD

The described embodiments generally relate to methods and apparatuses for performing provisioning of an embedded user identity module card in a mobile wireless device. More particularly, the present embodiments describe device initiated provisioning of the user identity module card through a bearer independent protocol.

BACKGROUND

Wireless networks and mobile wireless devices continue to evolve as new communication technologies develop and standardize. Current wireless network deployments support both circuit switched (CS) and packet switched (PS) connections as well as newer internet protocol multimedia service (IMS) connections. Mobile wireless devices can include user identity module (UIM) cards, typically removable and configurable, that can contain subscriber and network information, authentication data and service configurations available to a wireless network subscriber. Access to different wireless network services for a user of a mobile wireless device can be configured through a provisioning of the embedded UIM card in the mobile wireless device. Provisioning data can be transferred to the UIM card through a data connection from a server in the wireless network. Representative wireless networks can include those specified by one or more releases of wireless communication protocols specified by the Third Generation Partnership Project (3GPP) and Third Generation Partnership Project 2 (3GPP2) communication standards organizations. The 3GPP develops mobile communication standards include releases for Global System for Mobile Communications (GSM), General Packet Radio Service (GPRS), Universal Mobile Telecommunications System (UMTS), Long Term Evolution (LTE) and LTE Advanced standards. The 3GPP2 develops wireless communication standards that include CDMA2000 1xRTT and 1xEV-DO standards.

Wireless networks that use different wireless communication protocols can use different methods to provision embedded UIM cards. CDMA2000 wireless networks can perform UIM card provisioning through a process known as over the air service provisioning (OTASP), which allows a user of a wireless network subscriber to become authorized for wireless services on the CDMA2000 wireless network. OTASP can be used for initial provisioning of a "new" mobile wireless device as well as for updating service configurations of the mobile wireless device. Similarly, GSM/GPRS and UMTS wireless networks can perform UIM card provisioning through a short message service point to point (SMS-PP) connection. In both instances, the OTASP and SMS-PP connections can use a circuit switched link between the mobile wireless device and the wireless network over which to transfer the provisioning data. These initial CS links between the mobile wireless device and the wireless network can be limited in data throughput, which can increase the time required to download the provisioning data to the UIM card for the mobile wireless device. LTE (and LTE-Advanced) wireless networks can use a newer provisioning mechanism known as a bearer independent protocol (BIP) that can use a packet switched (PS) data connection between the mobile wireless device and a server in the wireless network to transfer the provisioning data at a faster data rate than offered by a CS connection. The BIP provisioning method can also be applied to wireless networks that use other wireless cellular technologies when the wireless network can establish a packet switched data connection for the mobile wireless device to the server in the wireless network to provision the UIM card.

Initial provisioning of UIM cards in mobile wireless devices today can require a customer service call (e.g. using a *228xx service code) to the wireless network or can be performed automatically by firmware in the UIM card that initiates a connection to the wireless network for the provisioning. Presently, card provisioning cannot be controlled by a processor in the mobile wireless device based on the current wireless communication protocols; rather, the provisioning process is under the control of the UIM card firmware. As UIM card firmware can vary across different service providers, the processor software cannot control or anticipate when and how the provisioning process for the UIM card will start. Additionally, current UIM card file structures do not include information about provisioning of the UIM card at a top level that can be easily read by a processor in the mobile wireless device. While provisioning information may be available within an application specific file in the UIM card, there is no standardization of the card provisioning information available for a processor in the mobile wireless device request and read from the UIM card to determine the state of provisioning. With limited control of the provisioning process and status, the processor can be unable to supply information to the user of the mobile wireless device about the provisioning state and/or provisioning process. Thus, there exists a need for a method whereby provisioning of the UIM card in the mobile wireless device can be initiated by a processor in the mobile wireless device and/or by a user thereof and a method whereby UIM card provisioning status can be easily determined by the processor in the mobile wireless device.

SUMMARY OF THE DESCRIBED EMBODIMENTS

In one embodiment, a method to provision a user identity module (UIM) card executed by a processor in a mobile wireless device is described. The method includes at least the following steps. In a first step, the processor in the mobile wireless device detects a user command to provision the UIM card. Subsequently, the processor reads a provisioning status of the UIM card from a UIM card provisioning status file in the UIM card. When the provisioning status is "not provisioned", the processor establishes a bearer independent protocol (BIP) data connection to a server in a wireless network and exchanges provisioning data between the server and the UIM card until the UIM card commands the processor to close the BIP data connection. In representative embodiments, the UIM card provisioning status file includes at least fields for the UIM card provisioning status, a UIM card software version and a UIM card provisioning date/time, and the processor in the mobile wireless device updates the UIM card software version and UIM card provisioning date/time based on information provided by the server during provisioning of the UIM card.

In another embodiment, a mobile wireless device including a user identity module card and a configurable processor is described. The processor is configured to detect a user command to provision the UIM card. The processor is also configured to read a provisioning status of the UIM card from a UIM card provisioning status file in the UIM card. The UIM card provisioning status file includes at least fields for the UIM card provisioning status, a UIM card software version and a UIM card provisioning date/time. When the provisioning status is "not provisioned", the processor is further configured to establish a bearer independent protocol (BIP) data connection to a server in a wireless network and to exchange provisioning data between the server and the UIM card until the UIM card commands the processor to close the BIP data connection.

In a further embodiment, a computer program product encoded in a non-transitory computer readable medium for provisioning a user identity module (UIM) card executed by a processor in a mobile wireless device is described. The computer program product in the mobile wireless device includes the following computer program code. Computer program code for detecting a user or processor command to provision the UIM card. Computer program code for reading a provisioning status of the UIM card from a UIM card provisioning status file in the UIM card. Computer program code for, when the provisioning status is "not provisioned", establishing a bearer independent protocol (BIP) data connection to a server in a wireless network and establishing a bearer independent protocol (BIP) data connection to a server in a wireless network.

The embodiments disclosed herein can apply equally to mobile wireless devices that connect with GSM networks, UMTS networks, CDMA2000 networks, LTE networks and LTE-Advanced networks and also to mobile wireless devices that can connect in parallel to combinations of wireless networks.

BRIEF DESCRIPTION OF THE DRAWINGS

The described embodiments and the advantages thereof may best be understood by reference to the following description taken in conjunction with the accompanying drawings.

FIG. 8 illustrates select fields of an elementary file used for storing UIM card provisioning status information.

DETAILED DESCRIPTION OF SELECTED EMBODIMENTS

Figure 1:
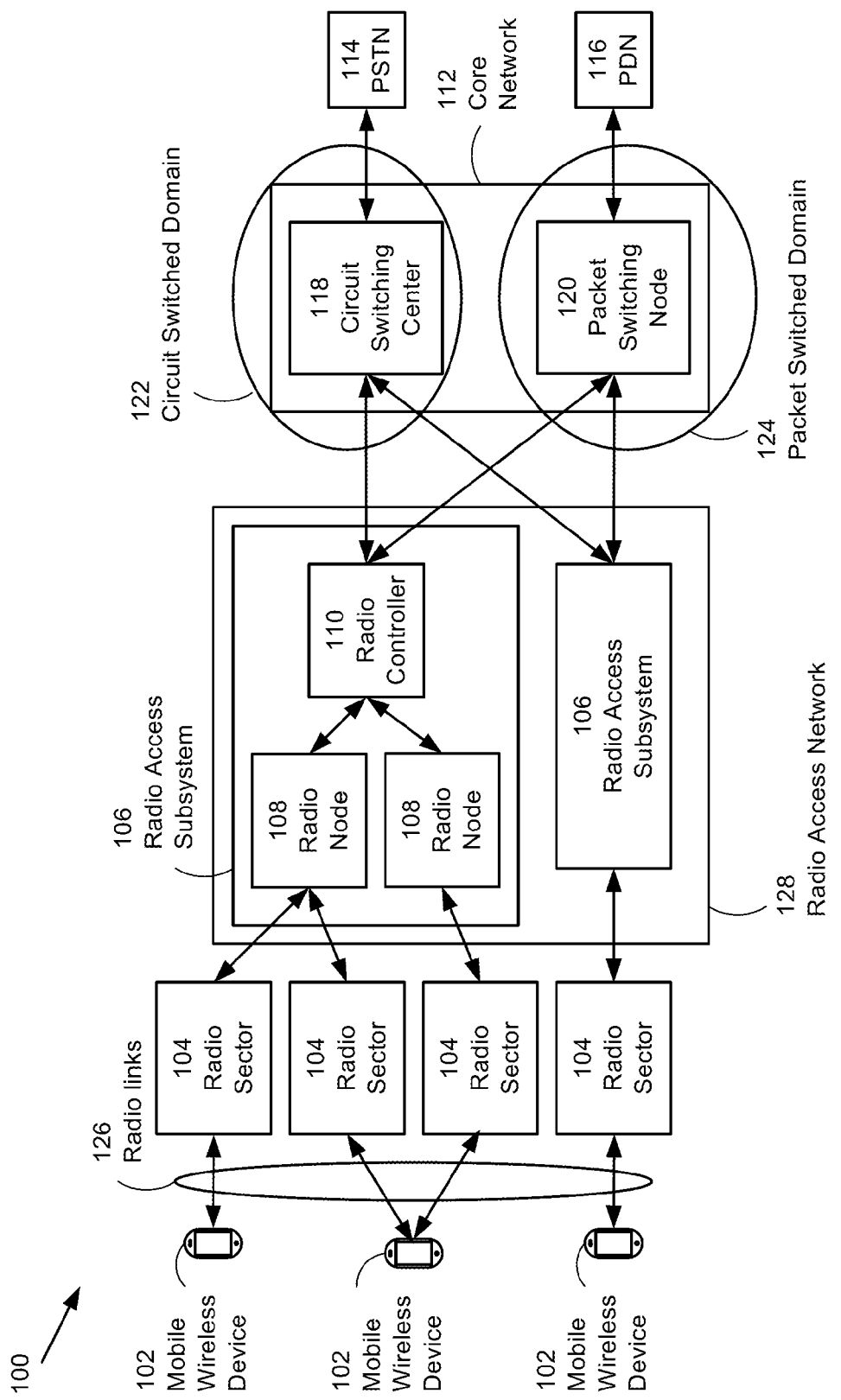
FIG. 1 illustrates components of a generic wireless network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe various methods and apparatuses to perform provisioning of a user identity module (UIM) card embedded in a mobile wireless device and to store and retrieve details of provisioning status information contained in the UIM card. The UIM card described herein can also be referred to as a universal integrated circuit card (UICC). The present embodiments provide for initiating provisioning of the UIM card by a user of the mobile wireless device and by a processor in the mobile wireless device rather than by firmware in the UIM card. In addition, the UIM card can include a readable file in a standardized format that contains information about the provisioning status of the UIM card (and therefore of the mobile wireless device in which the UIM card is embedded). UIM cards can contain subscriber information and network information, authentication data and service configuration information for a particular subscriber to one or more wireless networks. A UIM card can include "application" firmware that provides access to particular wireless networks that use specific wireless communications protocols. For example, a universal subscriber identity module (USIM) application can provide access to a GSM/GPRS wireless network, a UMTS wireless network as well as to LTE/LTE advanced wireless networks, while a CSIM application can provide access to a CDMA2000 wireless network. The UIM card can also include an ISIM application for access to internet protocol multimedia services (IMS). Access to different wireless network services for the user of the mobile wireless device can be configured through "provisioning" of the embedded UIM card in the mobile wireless device. Provisioning data can be transferred to the UIM card through a connection to a provisioning server in the wireless network.

GSM/GSRS and UMTS wireless networks can perform UIM card provisioning through a circuit switched SMS-PP connection, while CDMA2000 wireless networks can perform UIM card provisioning through a circuit switched OTASP connection, and LTE/LTE-Advanced wireless networks can perform UIM card provisioning through a packet switched BIP connection. A packet switched BIP connection provisioning method can also be applied to wireless networks that use other wireless cellular technologies when the wireless network can establish a packet switched data connection to the mobile wireless device to provision the UIM card. The UIM card can contain firmware that initiates a circuit switched and/or a packet switched connection to a provisioning server in the wireless network and transfers data from the provisioning server to the UIM card. A processor in the mobile wireless device can respond to commands from the UIM card to establish the CS/PS connection to the provisioning server; however, wireless communication protocols presently do not support the processor initiating the provisioning process under its own direction. Similarly a user of the mobile wireless device cannot control the provisioning process through an application in a user interface, e.g. a "settings" application (that can interact with the processor and thence the UIM card in the mobile wireless device). Instead, initial provisioning of UIM cards can be performed by "dialing" a specific customer service code to the wireless network or by waiting for firmware in the UIM card to initiate the provisioning automatically. As each wireless network service provider and UIM card firmware application can operate differently, the user experience of initial provisioning a mobile wireless device can vary substantially. In addition, current UIM card file structures do not provide for a consistent standardized readable format to maintain provisioning status information at a top level of the UIM card file system.

To overcome the limitations outlined above, the embodiments herein describe a user (and/or processor) initiated BIP procedure for UIM card provisioning. The BIP procedure can operate on different wireless networks and can particularly apply to "initial" UIM card provisioning (although update provisioning of the UIM card can also use a similar procedure.) In response to a user input command received through a user interface, the processor in the mobile wireless device can establish a data connection to a specific access point name (APN) address. The established data connection can be used to transfer data from a provisioning server at the APN address to the UIM card. Different APN addresses can be used to connect to different wireless networks; however, the process to use a BIP connection at the user behest (or at the initiation of software operating a processor in the mobile wireless device) without waiting for initiation from the UIM card to provision the UIM card can be independent of the underlying wireless network cellular technology. In addition, a file can be placed at a top level of a hierarchy of files on the UIM card having a standardized format to detail the provisioning status of the UIM card. The provisioning status file can include information about a state of provisioning of the UIM card, a version of software/firmware installed in the provisioned UIM card, and a date/time of provisioning for the UIM card.

These and other embodiments are discussed below with reference to FIGS. 1-9. However, those skilled in the art will readily appreciate that the detailed description given herein with respect to these figures is for explanatory purposes only and should not be construed as limiting.

FIG. 1 illustrates a representative generic wireless communication network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency carrier at a selected frequency. Radio sectors 104 can have different geometric shapes depending on antenna configuration, such as radiating outward in an approximate circle or hexagon from a centrally placed radio node 108 or cone shaped for a directional antenna from a corner placed radio node 108. Radio sectors 104 can overlap in geographic area coverage so that the mobile wireless device 102 can receive signals from more than one radio sector 104 simultaneously. Each radio node 108 can generate one or more radio sectors 104 to which the mobile wireless device 102 can connect by one or more radio links 126.

In some wireless networks 100, the mobile wireless device 102 can be connected to more than one radio sector 104 simultaneously. The multiple radio sectors 104 to which the mobile wireless device 102 is connected can come from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

In order for the mobile wireless device 102 to be configured for a particular set of services offered by the wireless network 100, a configurable UIM card in the mobile wireless device 102 is supplied with a set of software/firmware specific to a wireless network service provider, e.g. AT&T, Verizon or Sprint. The software/firmware can include information specific to the wireless service provider's wireless network 100 as well as information specific to the user of the mobile wireless device 102. A single UIM card can include information for multiple wireless network service providers. The provisioning server can be located in the core of the wireless network, e.g. attached to the circuit switched domain 122 and/or the packet switched domain 120.

Figure 2:
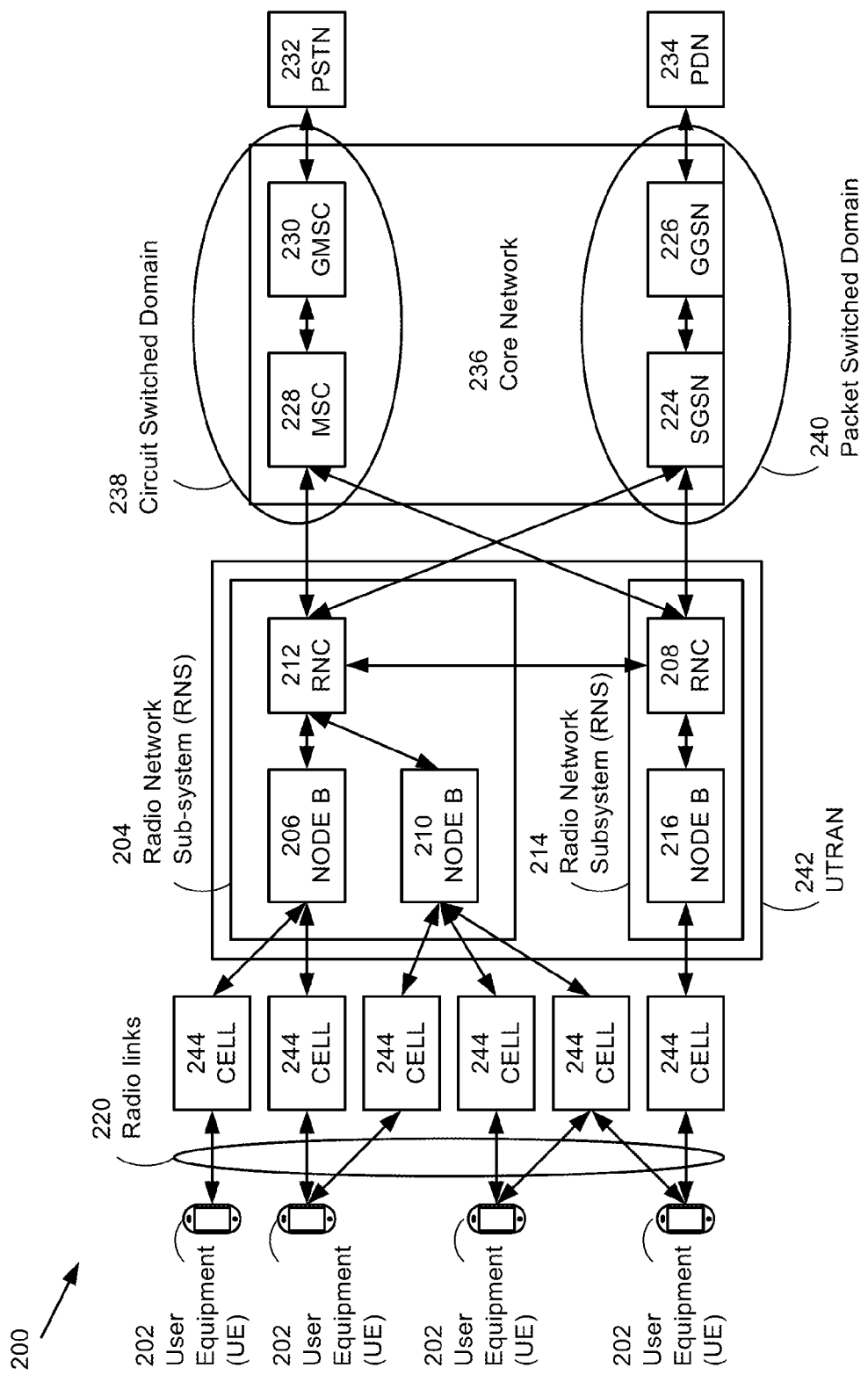
FIG. 2 illustrates components of a UMTS wireless network.

FIG. 2 illustrates a representative UMTS wireless communication network 200 that can include one or more user equipment (UE) 202 that can communicate with a UMTS terrestrial radio access network (UTRAN) 242 that can connect to a core network (CN) 236. (The UE 202 shown in FIG. 2 can be considered a representative type of the mobile wireless device 102 described in FIG. 1.) The core network 236 can include a circuit switched domain 238 that can connect the UE 202 to a public switched telephone network (PSTN) 232 and a packet switched domain 240 that can connect the UE 202 to a packet data network (PDN) 234. The UTRAN 242 can include one or more radio network sub-systems (RNS) 204/214 each of which can include a radio network controller (RNC) 208/212 and one or more Node-Bs (base stations) 206/210/216 managed by a corresponding RNC. The RNC 208/212 within the UTRAN 242 can be interconnected to exchange control information and manage packets received from and destined to the UE 202. Each RNC 208/212 can handle the assignment and management of radio resources for the cells 244 through which the UE 202 connect to the wireless network 200 and can operate as an access point for the UE 202 with respect to the core network 236. The Node-B 206/210/216 can receive information sent by the physical layer of UE 202 through an uplink and transmit data to UE 202 through a downlink and can operate as access points of the UTRAN 242 for UE 202.

UTRAN 242 can construct and maintain a radio access bearer (RAB) for communication between UE 202 and the core network 236. Services provided to a specific UE 202 can include circuit switched (CS) services and packet switched (PS) services, and radio resources can be established separately for the CS and PS services. A general voice conversation can be transported as a circuit switched service, while a Web browsing application can provide access to the World Wide Web (WWW) through an internet connection that can be classified as a packet switched (PS) service. To support circuit switched services, the RNC 208/212 can connect to the mobile switching center (MSC) 228 of core network 236, and MSC 228 can be connected to gateway mobile switching center (GMSC) 230, which can manage connections to other networks, such as the PSTN 232. To support packet switched services, the RNC 208/212 can also be connected to serving general packet radio service (GPRS) support node (SGSN) 224, which can connect to gateway GPRS support node (GGSN) 226 of core network 236. SGSN 224 can support packet communications with the RNC 208/212, and the GGSN 226 can manage connections with other packet switched networks, such as the PDN 234. A representative PDN 234 can be the "Internet".

Figure 3:
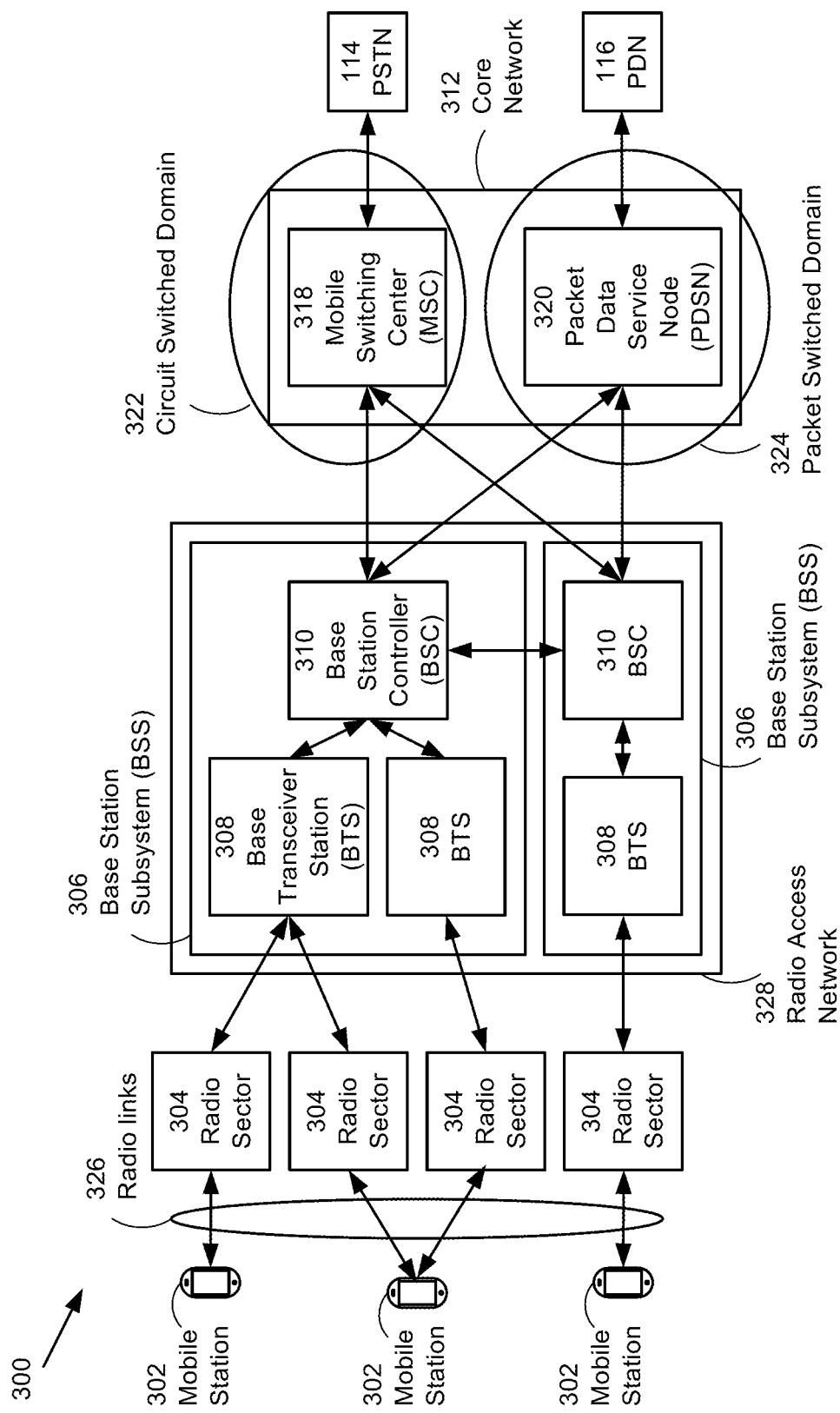
FIG. 3 illustrates components of a CDMA2000 1x wireless network.

FIG. 3 illustrates a representative CDMA2000 1x wireless network 300 that can include elements comparable to those described earlier for the generic wireless network 100 and the UMTS wireless network 200. (A mobile station 302 shown in FIG. 3 can be considered a representative type of the mobile wireless device 102 described in FIG. 1.) Multiple mobile stations 302 can connect to one or more radio sectors 304 through radio frequency links 326. Each radio sector 304 can radiate outward from a base transceiver station (BTS) 308 that can connect to a base station controller (BSC) 310, together forming a base station subsystem (BSS) 306. Multiple base station subsystems 306 can be aggregated to form a radio access network 328. Base station controllers 310 in different base station subsystems 306 can be interconnected. The base station controllers 310 can connect to both a circuit switched domain 322 that use multiple mobile switching centers (MSC) 318 and a packet switched domain 324 formed with packet data service nodes (PDSN) 320, which together can form a core network 312 for the wireless network 300. As with the other wireless networks 100/200 described above, the circuit switched domain 322 of the core network 312 can interconnect to the PSTN 114, while the packet switched domain 324 of the core network 312 can interconnect to the PDN 116.

Figure 4:
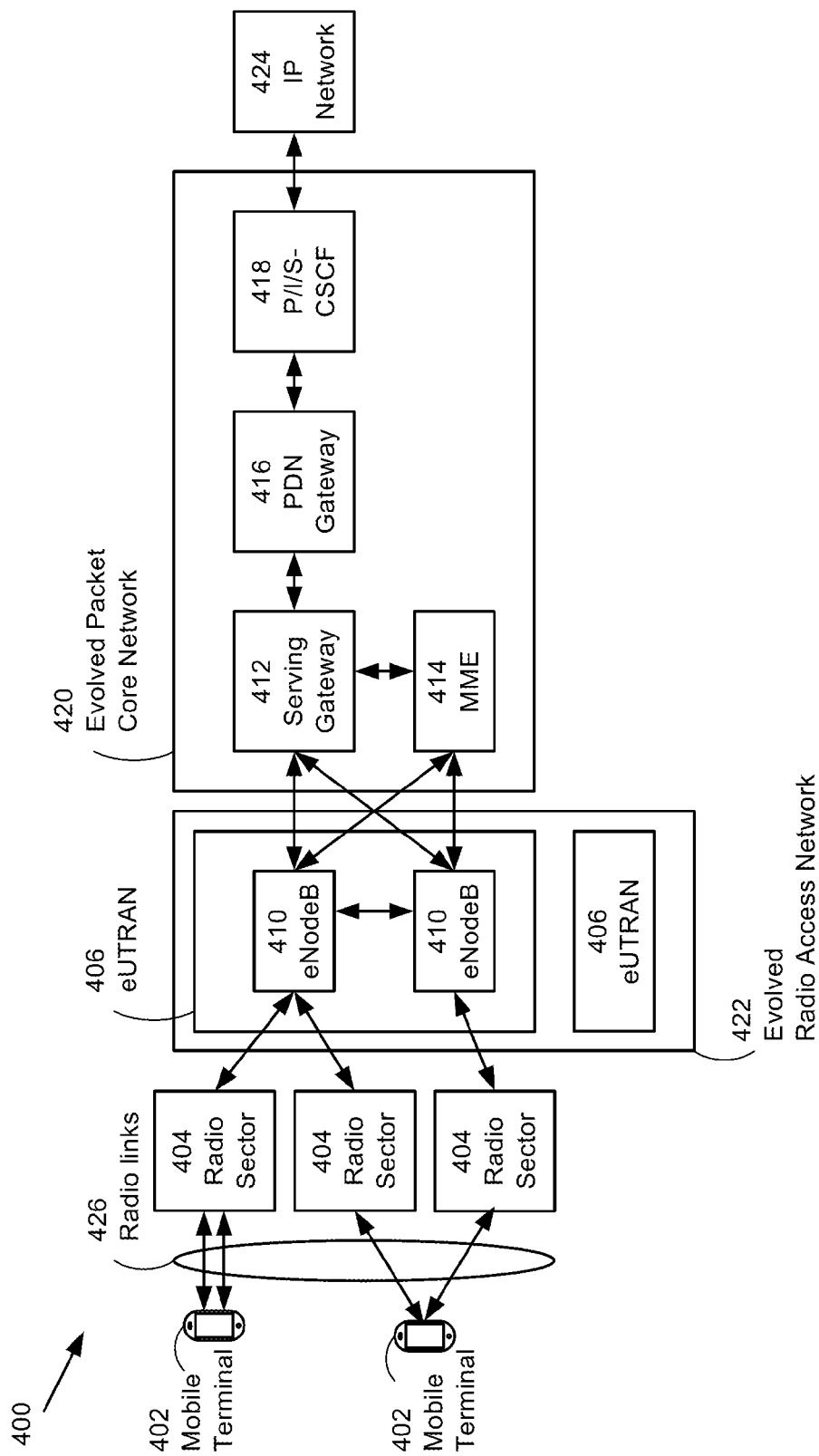
FIG. 4 illustrates components of a LTE wireless network.

FIG. 4 illustrates a representative Long Term Evolution (LTE) wireless network 400 architecture designed as a packet switched network exclusively. A mobile terminal 402 can connect to an evolved radio access network 422 through radio links 426 associated with radio sectors 404 that emanate from evolved Node B's (eNodeB) 410. The eNodeB 410 includes the functions of both the transmitting and receiving base stations (such as the Node B 206 in the UMTS network 200 and the BTS 308 in the CDMA2000 network 300) as well as the base station radio controllers (such as the RNC 212 in the UMTS network 200 and the BSC 310 in the CDMA2000 network 300). The equivalent core network of the LTE wireless network 400 is an evolved packet core network 420 including serving gateways 412 that interconnect the evolved radio access network 422 to public data network (PDN) gateways 416 that connect to external internet protocol (IP) networks 418. Multiple eNodeB 410 can be grouped together to form an evolved UTRAN (eUTRAN) 406. The eNodeB 410 can also be connected to a mobility management entity (MME) 414 that can provide control over connections for the mobile terminal 402.

Figure 5:
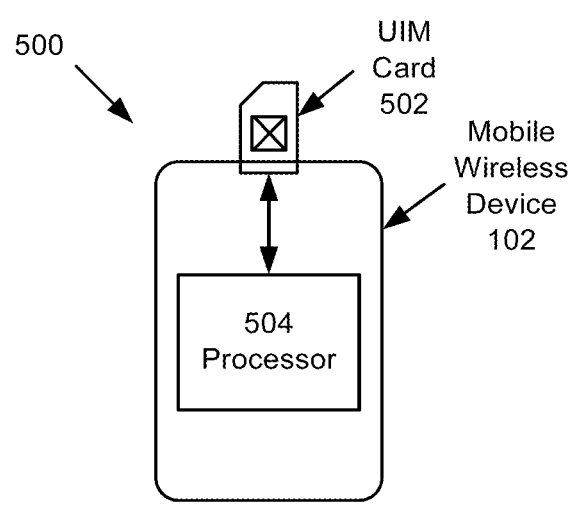
FIG. 5 illustrates a representative set of select components of a mobile wireless device.

FIG. 5 illustrates select elements 500 of the mobile wireless device 102. A UIM card 502 can be included in the mobile wireless device 102 and can contain information and software/firmware for services of the mobile wireless device 102. The UIM card 502 can also be referred to as a subscriber identity module (SIM) card for GSM and GPRS wireless networks, a universal subscriber identity module (USIM) card for the UMTS network 200, a CDMA subscriber identity module (CSIM) application on a removable user identity module (R-UIM) card for the CDMA2000 1x/EV-DO wireless network 300, and a universal integrated circuit card (UICC) for the LTE wireless network 400. Herein the UIM card 502 can refer to any of these "smart cards" that can be used in the mobile wireless device 102.

Applications to provide services to a user of the mobile wireless device 102 and functions required to interconnect the mobile wireless device 102 with different types of wireless networks can be resident on the UIM card 502. Messages (also referred to as commands) can be communicated between the UIM card 502 and a processor 504 in the mobile wireless device 102. The UIM card 502 can send "proactive" commands to the processor 504 in the mobile wireless device 102 thereby triggering a change in behavior of the mobile wireless device 102. The mobile wireless device 102 can also send "envelope" commands to the UIM card 502 to inform the UIM card 502 of status information of the mobile wireless device 102 and to trigger actions in the UIM card 502. A representative set of commands used for information exchange between the UIM card 502 and the processor 504 in the mobile wireless device 102 can be a UIM "toolkit" specified by a wireless communication standard published by a wireless standards organization (e.g. 3GPP) and/or by a supplier of the UIM card 502 (e.g. Gemalto) and/or by a wireless network 100 operator (e.g. AT&T) that provides software/firmware in the UIM card 502. As supplied in the mobile wireless device 102 upon purchase, the UIM card 502 can include software/firmware that is specific to one or more wireless network operators; however, additional information can also be added upon an initial provisioning of the UIM card 502 with a server in the wireless network 100. The initial provisioning can download additional information for the wireless network operator as well as configure specific information in the UIM card 502 for the individual subscriber that will use the mobile wireless device 102 with the wireless network 100. The processor 504 can control communication of radio frequency hardware in the mobile wireless device 102 to connect with the wireless network 100 and to exchange data through a radio frequency link to the wireless network 100; however, current wireless communication protocols specify the UIM card 502 to initiate the provisioning based on its own preloaded software/firmware. The processor 504 can also intercept commands from the user of the mobile wireless device 102 received through a user interface and can interpret received commands that seek to provision the UIM card 502 in the mobile wireless device 102.

Figure 6:
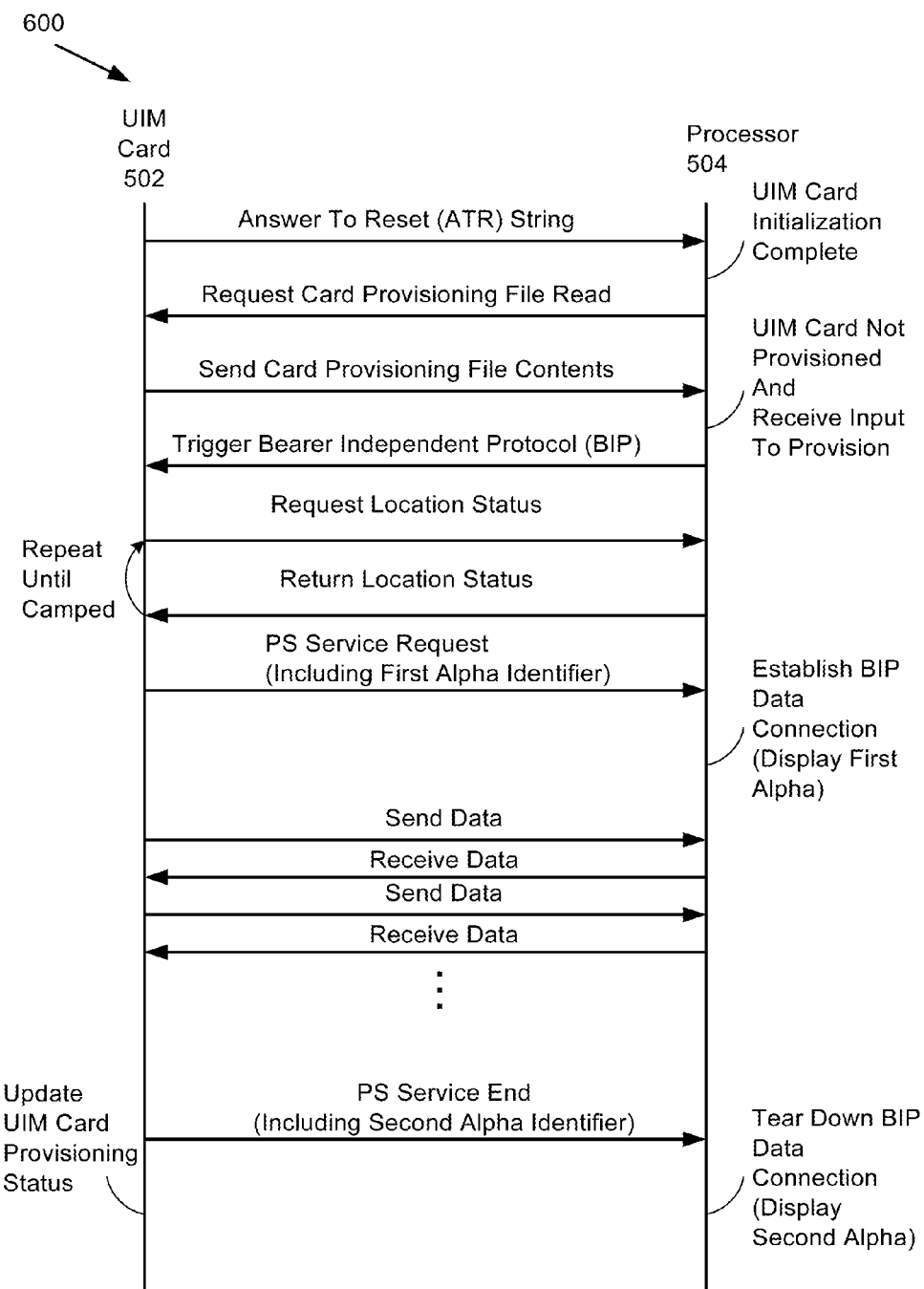
FIG. 6 illustrates a sequence of commands sent between a processor and a user identity module (UIM) card in the mobile wireless device and actions undertaken by the UIM card and the processor to interact with a wireless network.

FIG. 6 illustrates a representative sequence 600 of commands and actions that the processor 504 and the UIM card 502 in the mobile wireless device 102 can exchange and undertake. With the sequence of commands and actions shown, the processor 504 in the mobile wireless device 102 can initiate provisioning of the UIM card 502. By initiating the UIM card 502 provisioning, the processor 504 in the mobile wireless device 102 can be aware of when the UIM card provisioning has started and is in process and can provide indications of the card provisioning progress through the user interface of the mobile wireless device 102 to a user of the mobile wireless device 102.

As shown in FIG. 6, initially the UIM card 502 can indicate that UIM card initialization has completed by sending an answer to reset (ATR) string to the processor 504 in the mobile wireless device 102. When UIM card initialization is complete, the processor 504 can send a command to the UIM card 502 requesting information to be read from a UIM card provisioning file. In a representative embodiment, the UIM card file system can include a card provisioning status file available to read at the top level of the UIM card file system. The request from the processor 504 to the UIM card 502 can include a "read" command of the card provisioning status file.

In response to the read command received from the processor 504 in the mobile wireless device 102, the UIM card 502 can send to the processor 504 some or all contents of the card provisioning status file. In representative embodiments, this card provisioning status file can include fields as described further below for FIG. 7, e.g. a provisioning status of the UIM card 502, a software version, and a UIM card provisioning date/time. When the provisioning status of the UIM card 502 read from the card provisioning status file contains a "not provisioned" value and when the processor 504 detects an input to provision the UIM card 502, the processor 504 can initiate the UIM card 502 provisioning process. The input to provision the UIM card 502 can include a selection through a user interface or a sequence of digits/letters received through the user interface (e.g. *228xx "dialed" input). The processor 504 can send a command to the UIM card 502 to trigger establishing a bearer independent protocol (BIP) connection between the mobile wireless device 102 and the wireless network 100. The processor 504 can send the BIP trigger in an envelope command to the UIM card 502.

In response to receiving the BIP trigger envelope command from the processor 504 in the mobile wireless device 102, the UIM card 502 can request location status information from the processor 504, e.g. by sending a "provide local information" command. The processor 504 in the mobile wireless device 102 can respond by returning a location status to the UIM card 502 that specifies the "camping" status of the mobile wireless device 102 with the wireless network 100. When the received location status value for the mobile wireless device 102 is "camped" (i.e. normal service), the UIM card 502 can request a packet switched (PS) data connection through the mobile wireless device 102 to the wireless network 100. A representative command from the UIM card 502 to establish the PS data connection can be an "open channel" command to the processor 504 in the mobile wireless device 102. The request to establish a PS connection can include a first alphabetic identifier string that the mobile wireless device 102 can display to the user of the mobile wireless device 102, e.g. "activating". The processor 504 in the mobile wireless device 102 can establish a bearer independent protocol data connection with the wireless network 100, and after the BIP data connection is established, the UIM card 502 can exchange data with a server in the wireless network 100. The processor 504 in the mobile wireless device 102 can transfer data between the UIM card 502 and the wireless network 100 through the BIP data connection until the UIM card 502 sends a command to the processor 504 in the mobile wireless device 102 to end the PS data connection. A representative command from the UIM card 502 to end the PS data connection can be a "close channel" command sent to the processor 504 in the mobile wireless device 102. The command to end the PS data connection from the UIM card 502 can include a second alphabetic identifier that the processor 504 can display to the user of the mobile wireless device 102 that indicates the provisioning process has completed. For example an "activation complete" message can be displayed to the user of the mobile wireless device 102. The processor 504 can tear down the PS BIP data connection in response to the command to end the PS data connection, and the UIM card 502 can update the UIM card 502 provisioning status maintained in the card provisioning status file at the top level of the file system in the UIM card 502 based on results of the provisioning.

Logic in the UIM card 502 can be required to recognize the command from the processor 504 to trigger the BIP data connection and to initiate the BIP provisioning process. The BIP trigger command sent to the UIM card 502 can resemble other envelope commands, e.g. similar to a mobile originated (MO) short message control command, a call control command or an unstructured supplemental service data (USSD) download command. The PS service request (open channel) command from the UIM card 502 can include a first alphabetic identifier string and/or a first Boolean value to notify the mobile wireless device 102 that UIM card 502 provisioning is starting (or has started). The PS service end (close channel) command from the UIM card 502 can include a second alphabetic identifier string and/or a second Boolean value to notify the mobile wireless device 102 that UIM card 502 provisioning has completed. The processor 504 in the mobile wireless device 102 can display information on the provisioning status to the user of the mobile wireless device 102 based on the received first and second alphabetic identifier strings and/or the received first and second Boolean values.

When the processor 504 reads the UIM card 502 provisioning file status from the UIM card 502, and when the UIM card 502 is also "provisioned" already, the processor 502 can elect to not trigger a BIP data connection. Periodic provisioning, e.g. for updates, can be scheduled by the UIM card 502 and/or by the processor 504 based on provisioning status information stored in the UIM card 502, such as based on values for the software version and the provisioning date/time contained in and read from the UIM card 502 provisioning status file. By using the software version and provisioning status date/time information, the UIM card 502 and processor 504 in the mobile wireless device 102 can determine whether to provision initially and/or to update provisioning of the UIM card 502 and can avoid unnecessarily establishing BIP data connections with the wireless network 100 to provision the UIM card 502 unnecessarily when initial provisioning or update provisioning is not required. For example, whenever the mobile wireless device 102 is rebooted or when a UIM card 502 is inserted in the mobile wireless device 102 presently the logic in the UIM card 502 can attempt a UIM card 502 provisioning process independent of whether the UIM card 502 is already provisioned or contains a latest software version. The method described herein can reduce these unnecessary provisioning attempts by the UIM card 502, thereby lowering signaling loads on the wireless network 100. The method can also provide control for UIM card 502 provisioning in response to the processor 504 in the mobile wireless device 102 and/or in response to a user input to the mobile wireless device 102.

Figure 7:
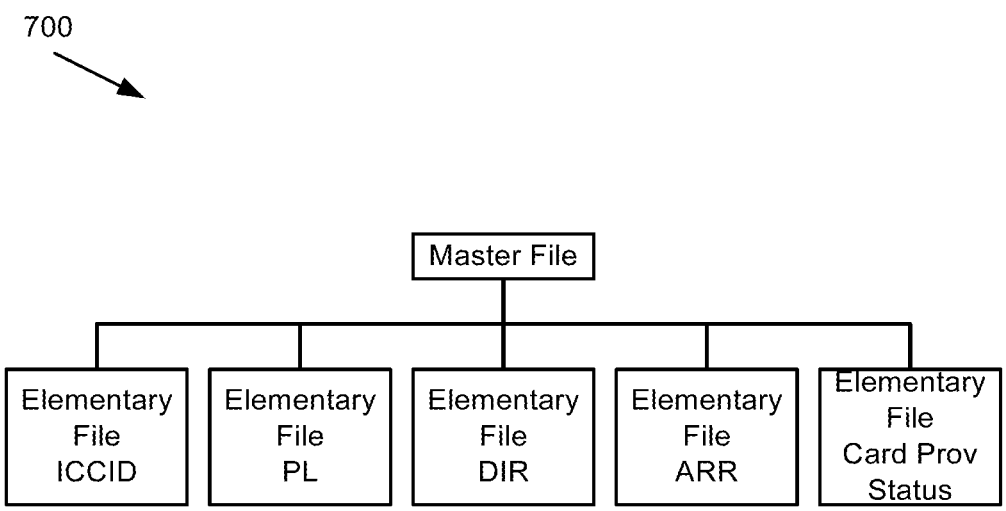
FIG. 7 illustrates a top level file structure for the UIM card.

FIG. 7. illustrates a representative top level file structure 700 contained in a UIM card 502. At the topmost level, a master file can exist in the UIM card 502. At a top level, a number of elementary files can exist. The top level elementary files under the master file can include an elementary file containing the integrated circuit card identity (ICCID), an elementary file containing preferred languages (EFPL), an elementary file containing application template data objects (EFDIR) and an elementary file containing access rule references (EFARR). In addition to these four application independent elementary files, FIG. 7 adds an elementary file containing card provisioning status. In a preferred embodiment, the card provisioning status EF is of a "transparent" type and read/write privileges for this EF file are PIN protected.

FIG. 8 illustrates a TLV structure 800 for the card provisioning status EF introduced in FIG. 7. A provisioning status type field can use one byte for a UIM card 502 provisioning status value. Representative card provisioning status values can include "not provisioned", "provisioned" and "reserved for future use". Specific values can include "not provisioned"='00', "provisioned"='01' and "reserved for future use"='FF'. Other specific values for the card provisioning status can also be used. The UIM card 502 software version can use four bytes, and each byte can refer to a level of a software version. For example, a software version of 1.2.3.4 can be represented with the bytes having the following values: byte 1=1, byte 2=2, byte 3=3 and byte 4=4. The UIM card 502 provisioning date/time field can include 7 bytes that can use a coding as used for a date/time value of an incoming call information (ICI) elementary file (0x6F80). The total EF card provisioning status file size can be 12 bytes, while the update, deactivate and activate access conditions can be set for an administrator (ADM) level.

Figure 9:
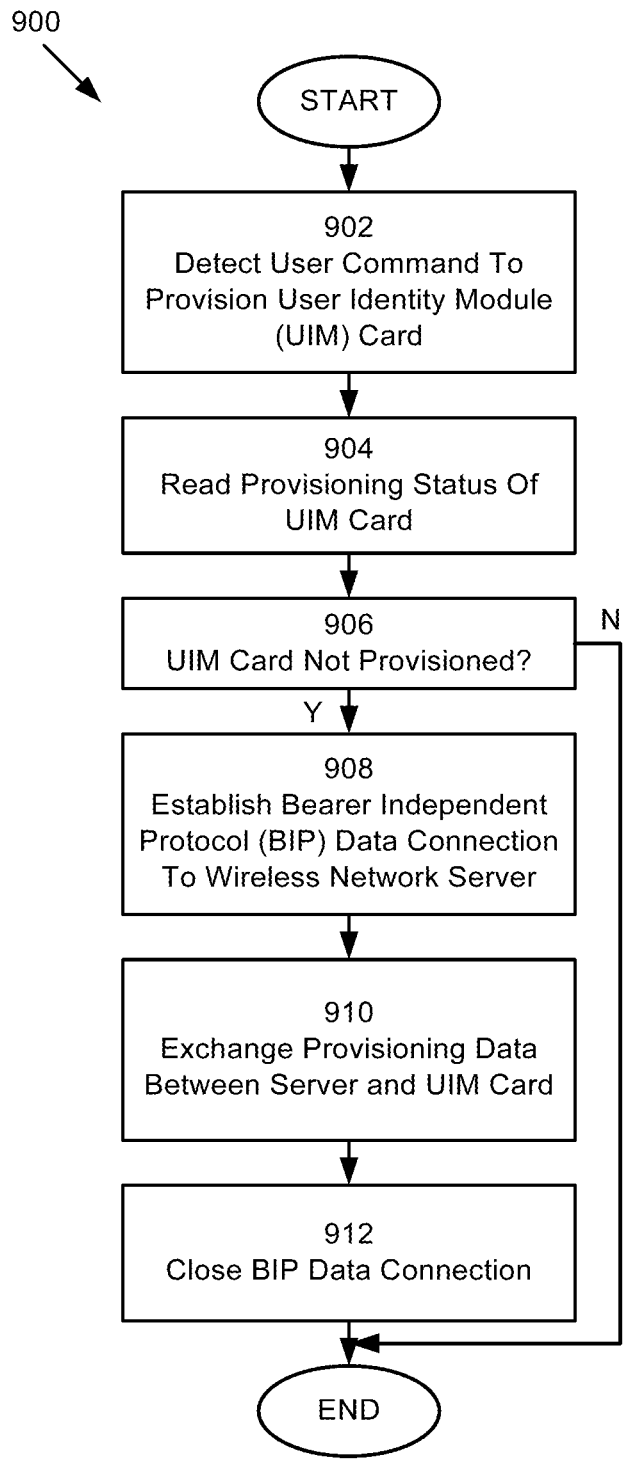
FIG. 9 illustrates a representative method to provision a user identity module (UIM) card executed by the processor in the mobile wireless device.

FIG. 9 illustrates a representative method 900 to provision the UIM card 502 in the mobile wireless device 102 initiated by the user of (and/or by the processor 504 in) the mobile wireless device 102. In step 902, the processor 504 detects a user command to provision the UIM card 502. In step 904, the processor 504 reads a provisioning status of the UIM card 502 from a card provisioning status file contained in the file system of the UIM card 502. In step 906, the processor 504 determines that state of the UIM card 502 provisioning 502 based on information read back from the card provisioning status file received from the UIM card 502. When the UIM card 502 provisioning status indicates that the UIM card 502 is already provisioned (i.e. not "not provisioned"), the method ends. When the UIM card 502 provisioning status indicates that the UIM card 502 is "not provisioned" as determined in step 906, the processor 504, in step 908, establishes a bearer independent protocol (BIP) data connection to a server in the wireless network 100. In representative embodiments, the address for the server can be already known to the processor 504, can be read from a file stored in the UIM card 502, can be sent to the processor 504 by the UIM card 502, can be read from a file in the mobile wireless device 102, or can be received from an external input (e.g. input through a user interface). In step 910, the processor 504 in the mobile wireless device 102 exchanges provisioning data between the server in the wireless network 100 and the UIM card 502 embedded in the mobile wireless device 102. When the provisioning data exchange between the UIM card 502 and the server in the wireless network completes, the processor 504 in step 912 closes the BIP data connection between the mobile wireless device 102 and the server in the wireless network 100.

In representative embodiments, the method 900 illustrated in FIG. 9 includes additional steps. When the provisioning status indicates that the UIM card 502 is "not provisioned" as determined in step 906, the processor 504 sends a command to the UIM card 502 to trigger provisioning of the UIM card 502. In an embodiment, the trigger provisioning command is an "envelope" command. The processor 504 subsequently receives an "open channel" command from the UIM card 502 and establishes the BIP data connection with the wireless network 100 in response to the received "open channel" command. In an embodiment, the "open channel" command received from the UIM card 502 includes an activation alphabetic identifier and/or Boolean value, and the processor 504 displays the activation alphabetic identifier (or another activation message based on the identifier and/or based on the Boolean value) on a display of the mobile wireless device 102 while the BIP data connection is established. In an embodiment, the method 900 further includes the processor 504 receiving an activation complete alphabetic identifier and/or Boolean value and displaying the activation complete alphabetic identifier (or another activation complete message based on the received identifier and/or based on the Boolean value) on the display of the mobile wireless device 102. In an embodiment, the UIM card 502 provisioning status file includes at least fields for a UIM card 502 card provisioning status, a UIM card 502 software version and a UIM card 502 card provisioning date/time. In a further embodiment, the UIM card 502 updates the UIM card software version and UIM card provisioning date/time based on information provided by the server during provisioning of the UIM card 502.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to provision a user identity module (UIM) card executed by a processor in a mobile wireless device, the method comprising:
   detecting a user command to provision the UIM card;
   reading a provisioning status of the UIM card from a UIM card provisioning status file in the UIM card; and
   when the provisioning status of the UIM card is "not provisioned":
      establishing a bearer independent protocol (BIP) data connection to a server in a wireless network; and
      exchanging provisioning data between the server and the UIM card until the UIM card commands the processor to close the BIP data connection.

2. The method as recited in claim 1, further comprising:
   when the provisioning status of the UIM card is "not provisioned":
      sending a command to the UIM card to trigger provisioning of the UIM card;
      receiving an open channel command from the UIM card; and
      establishing the BIP data connection in response to receiving the open channel command from the UIM card.

3. The method as recited in claim 2, further comprising:
   receiving an activation alphabetic identifier included in the open channel command from the UIM card; and
   displaying the activation alphabetic identifier on a display of the mobile wireless device while the BIP data connection is established.

4. The method as recited in claim 3, further comprising:
   receiving an activation complete alphabetic identifier in a close channel command from the UIM card; and displaying the activation complete alphabetic identifier on the display of the mobile wireless device when the UIM card provisioning completes.

5. The method as recited in claim 1, wherein the UIM card provisioning status file includes at least fields for the provisioning status of the UIM card, a UIM card software version, and a UIM card provisioning date/time.

6. The method as recited in claim 5, further comprising:
updating the UIM card software version and the UIM card provisioning date/time based on information provided by the server during provisioning of the UIM card.

7. The method as recited in claim 1, wherein the UIM card provisioning status file is maintained in the UIM card at a top level of a hierarchy of files under a master file.

8. A mobile wireless device comprising:
a user identity module (UIM) card; and
a processor configured to:
  detect a user command to provision the UIM card;
  read a provisioning status of the UIM card from a UIM card provisioning status file in the UIM card, wherein the UIM card provisioning status file includes at least fields for the provisioning status of the UIM card, a UIM card software version, and a UIM card provisioning date/time; and
  when the provisioning status of the UIM card is "not provisioned":
    establish a bearer independent protocol (BIP) data connection to a server in a wireless network; and
    exchange provisioning data between the server and the UIM card until the UIM card commands the processor to close the BIP data connection.

9. The mobile wireless device as recited in claim 8, wherein the processor is further configured to:
when the provisioning status of the UIM card is "not provisioned":
  send a command to the UIM card to trigger provisioning of the UIM card;
  receive an open channel command from the UIM card; and
  establish the BIP data connection in response to receipt of the open channel command from the UIM card.

10. The mobile wireless device as recited in claim 9, further comprising:
a display;
wherein the processor is further configured to:
  receive an activation alphabetic identifier included in the open channel command from the UIM card; and
  display the activation alphabetic identifier on a display of the mobile wireless device while the BIP data connection is established.

11. The mobile wireless device as recited in claim 10, wherein the processor is further configured to:
receive an activation complete alphabetic identifier in a close channel command from the UIM card; and
display the activation complete alphabetic identifier on the display of the mobile wireless device when the UIM card provisioning completes.

12. The mobile wireless device as recited in claim 8, wherein the processor is further configured to:
update the UIM card software version and the UIM card provisioning date/time based on information provided by the server during provisioning of the UIM card.

13. The mobile wireless device as recited in claim 8, wherein the UIM card provisioning status file is maintained in the UIM card at a top level of a hierarchy of files under a master file.

14. Computer program product encoded in a non-transitory computer readable medium for provisioning a user identity module (UIM) card executed by a processor in a mobile wireless device, the computer program product comprising:
computer program code for detecting a user command or a processor command to provision the UIM card;
computer program code for reading a provisioning status of the UIM card from a UIM card provisioning status file in the UIM card; and
computer program code for, when the provisioning status of the UIM card is "not provisioned":
  establishing a bearer independent protocol (BIP) data connection to a server in a wireless network; and
  exchanging provisioning data between the server and the UIM card until the UIM card commands the processor to close the BIP data connection.

15. The computer program product as recited in claim 14, further comprising:
computer program code for, when the provisioning status of the UIM card is "not provisioned":
  sending a command to the UIM card to trigger provisioning of the UIM card;
  receiving an open channel command from the UIM card; and
  establishing the BIP data connection in response to receiving the open channel command from the UIM card.

16. The computer program product as recited in claim 15, further comprising:
computer program code for receiving an activation alphabetic identifier included in the open channel command from the UIM card; and
computer program code for displaying the activation alphabetic identifier on a display of the mobile wireless device while the BIP data connection is established.

17. The computer program product as recited in claim 16, further comprising:
computer program code for receiving an activation complete alphabetic identifier in a close channel command from the UIM card; and
computer program code for displaying the activation complete alphabetic identifier on the display of the mobile wireless device when the UIM card provisioning completes.

18. The computer program product as recited in claim 14, wherein the UIM card provisioning status file includes at least fields for the provisioning status of the UIM card, a UIM card software version and a UIM card provisioning date/time.

19. The computer program product as recited in claim 18, further comprising:
computer program code for updating the UIM card software version and the UIM card provisioning date/time based on information provided by the server during provisioning of the UIM card.

20. The computer program product as recited in claim 14, wherein the UIM card provisioning status file is maintained in the UIM card at a top level of a hierarchy of files under a master file.

* * * * *